Figure 1:
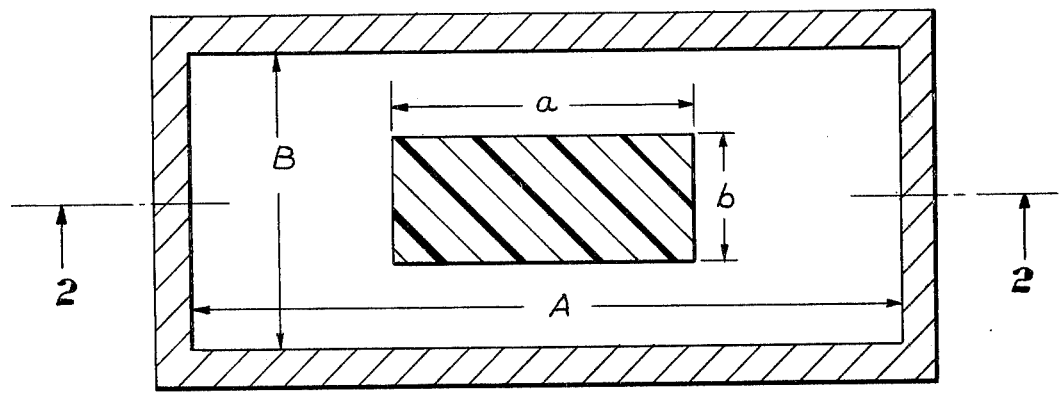

United States Patent [19]

Pip

[11] 4,387,066
[45] Jun. 7, 1983

[54] METHOD OF MAKING A FOAMED RESIN SHEET

[75] Inventor: Wolfgang Pip, Darmstadt, Fed. Rep. of Germany

[73] Assignee: Röhm GmbH, Darmstadt, Fed. Rep. of Germany

[21] Appl. No.: 156,185

[22] Filed: Jun. 3, 1980

[30] Foreign Application Priority Data

Jul. 19, 1979 [DE] Fed. Rep. of Germany ....... 2929165

[51] Int. Cl.³ .............................................. B29D 27/00
[52] U.S. Cl. ........................................ 264/55; 249/82; 249/160; 264/53; 264/54; 264/DIG. 5; 425/817 R
[58] Field of Search ..................... 264/55, 54, 46.5, 53, 264/DIG. 5; 249/82, 160; 425/817 R

[56] References Cited

U.S. PATENT DOCUMENTS

| | | | |
|---|---|---|---|
| 2,296,305 | 9/1942 | Roberts | 264/55 |
| 2,394,122 | 2/1946 | Urmston | 264/55 X |
| 2,590,156 | 3/1952 | Carpentier | 264/55 |
| 2,694,871 | 11/1954 | Rollman | 264/46.5 X |
| 3,222,437 | 12/1965 | Schilling | 264/54 |
| 3,627,711 | 12/1971 | Schroeder et al. | |
| 3,734,870 | 5/1973 | Schroeder et al. | |
| 3,818,086 | 6/1974 | Stastny et al. | 264/55 |
| 3,856,902 | 12/1974 | Kirkpatrick | 264/55 X |
| 3,897,190 | 7/1975 | Binzburg et al. | 264/55 X |
| 3,906,137 | 9/1975 | Bauer | |
| 4,139,685 | 2/1979 | Schroeder et al. | |

FOREIGN PATENT DOCUMENTS

| | | |
|---|---|---|
| 351242 | 7/1979 | Austria |
| 1504276 | 9/1969 | Fed. Rep. of Germany |
| 1694859 | 10/1974 | Fed. Rep. of Germany |
| 1817156 | 5/1976 | Fed. Rep. of Germany |
| 2547549 | 3/1977 | Fed. Rep. of Germany |
| 2114524 | 6/1977 | Fed. Rep. of Germany |
| 2726259 | 12/1978 | Fed. Rep. of Germany |
| 118824 | 3/1976 | German Democratic Rep. |
| 1045229 | 10/1966 | United Kingdom |
| 1078425 | 8/1967 | United Kingdom |

*Primary Examiner*—Philip E. Anderson
*Attorney, Agent, or Firm*—Curtis, Morris & Safford

[57] ABSTRACT

What is disclosed is a method for making a foamed resin sheet from a body of hot foamable synthetic resin containing a blowing agent, which method comprises heating said foamable body to a temperature which initiates foaming, limiting lateral expansion of the resulting foam by contact with a limiting surface while permitting free expansion of the foam thickness, then limiting further expansion of the foam thickness by contact with a limiting surface, and then cooling the foam below the foaming temperature while maintaining said limitations on foam expansion in the lateral and thickness directions by contact with said limiting surfaces.

4 Claims, 6 Drawing Figures

METHOD OF MAKING A FOAMED RESIN SHEET

The present invention relates to a method for the preparation of foamed synthetic resin sheets of predetermined dimensions and densities from sheets of hot foamable synthetic resin which contains a blowing agent. On heating to the foaming temperature, the synthetic resin softens and the blowing agent is converted into a gaseous condition with the formation of pores in the synthetic resin foam.

If sheets of foamable synthetic resin are permitted to foam freely, foamed sheets of different dimensions and different densities are formed even if the starting materials are of the same size. These variations are attributable to unavoidable differences in the constitution of the foamable material and in the foaming conditions. Differences in the temperatures reached on heating or in the rate of heating can produce differences in foaming behavior even in the same sheet, and still greater differences between one sheet and another. The more strongly the material foams, the larger are the dimensions of the foamed body and the smaller is its density. For the preparation of foamed synthetic resin sheets with standardized dimensions and densities, the variations which occur are undesirable since each foamed resin sheet which exceeds the required dimensions must be trimmed. An economical production of standardized foamed resin sheets is only possible if the desired standard size can still be recovered from foamed sheets which are at the lower limits of permissible variation. However, this means that the majority of all sheets must be trimmed, which leads to considerable losses. An increased demand for raw material also results from variations in density. Because strength properties are density-dependent, a minimum density value must be guaranteed. Production must be so adjusted that even the foamed sheets having the lowest density do not fall beneath the minimum density. The majority of sheets thus exceed the minimum density and contain more material than would be necessary for the nominal weight.

It is obvious to hinder variations in size and density in the preparation of synthetic resin foamed sheets by carrying out the foaming process in a hollow mold which limits the expansion of the foamable materials to a predetermined volume and, as a result thereof, also to a predetermined density. Such a technique is disclosed in Example 3 of German Pat. No. 1,694,859 wherein a 1 cm thick sheet of a methacrylonitrile-methacrylic acid copolymer, which contains about 5% of urea as the foaming agent, is heated at 180°–200° C. in a hollow mold, the interior volume of which with respect to length, breadth, and depth, was in each case 2.7 times as large as the original synthetic resin sheet. In this way, the hollow mold is completely filled.

In practice, this process entails considerable difficulties which make controlled production impossible. These difficulties have their origin in the aforementioned variations in foaming behavior. The uniform filling of the hollow mold is only successful if the foaming process proceeds completely isotropically. Extensive investigations of the foaming behavior of methacrylonitrile-methacrylic acid copolymers containing a blowing agent have shown that this isotropy is not the rule. Foaming in the thickness direction not only temporally precedes foaming in the direction of the plane of the sheet, but also reaches a higher foaming factor when expansion is unhindered. (The foaming factor is the ratio of the dimensions of the foam to the corresponding dimensions of the unfoamed starting material.) Further, differences in the foaming occur within a sheet. Thus, in many cases, the edge areas of the sheet foam more rapidly and higher than does the middle. If warming is not uniform, foaming can occur on one side of the sheet to a greater degree than on the other side.

The cause of all these differences can be that the foaming sheet fills the complete height of the cavity of the hollow mold in isolated places before the sidewardly expanding sheet has reached the side walls of the mold cavity. Because of the pressure of the foam, the sheet clamps itself tightly in the mold and no longer permits expansion of the sheet edges in the direction of the side walls. The sheet grows to a certain extent around the clamping sites, whereby distorted and unusable shapes are formed. These problems have proved insurmountable, even with a careful preparation of the foamable material and the most uniform heating possible.

Thus, the task was posed of avoiding the aforementioned difficulties when preparing a foamed resin sheet from a sheet of hot foamable synthetic resin. This task has been solved according to the present invention by a method which first inhibits sidewards expansion and thereafter inhibits expansion of the thickness of the foaming sheet by means of limiting surfaces. In this way, the foamed resin sheet touches the sidewards-limiting surfaces at an earlier point in time than it touches the surfaces which limit the growth in thickness. As a result, the sheet cannot jam itself between the surfaces limiting expansion in the thickness direction while expansion in the direction of the sidewards limits is still necessary.

The method of the present invention is carried out in such a way that the inner surfaces of a hollow mold having a base surface which is geometrically similar to the surface of the sheet to be foamed are used as the limiting surfaces. The ratio of the interior height of the hollow mold to the thickness of the unfoamed sheet is greater than the ratio between the corresponding dimensions of the base area of the mold and the area of the unfoamed sheet. The base surface of the hollow mold is geometrically similar to the surface of the foamable sheet if the former corresponds with the latter as to the position and magnitude of all its angles and if all sides thereof are larger in the same linear ratio. The method can also be carried out if there are slight deviations from strict geometric similarity. However, if the deviations exceed a value of about 5%, then disturbing deformations and incomplete filling of the mold cavity must be reckoned with. Namely, in these cases, the sheet can clamp itself between two opposing limiting sides and hinder further movement before the remaining edges of the sheet have reached the side limits.

The linear ratio of the corresponding sides of the mold base to the length of the edges of the unfoamed sheet is generally so chosen that it is slightly smaller than the foaming factor obtainable upon free foaming under the foaming conditions which are employed. In this way, the foaming process is interrupted by contact of the foam with the limiting surfaces shortly before its natural conclusion.

If the foaming factor obtainable for the increase in thickness on free foaming is greater than the foaming factor for sidewards growth in the same sheet, then it is still not sufficient that a correspondingly higher mold cavity be available for expansion in the thickness direction. Rather, the ratio of the interior height of the mold to the thickness of the unfoamed sheet should more closely approach the value of the foaming factor in the thickness direction than the ratio between the length of the sides of the mold cavity to the lengths of the sides of the unfoamed plate approaches the value of the foaming factor in the direction of the plane of the sheet. The measurement relationships used according to the invention will be described more fully hereinafter with respect to the preferred embodiment in which a rectangular sheet of foamable material is foamed in a rectangular cavity.

Figure 2:
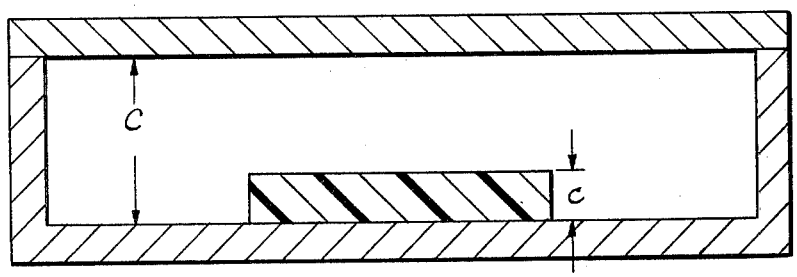
Figure 3:
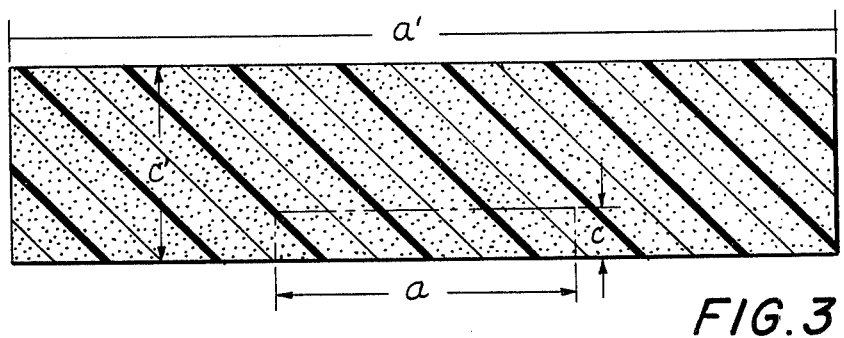
Figure 4:
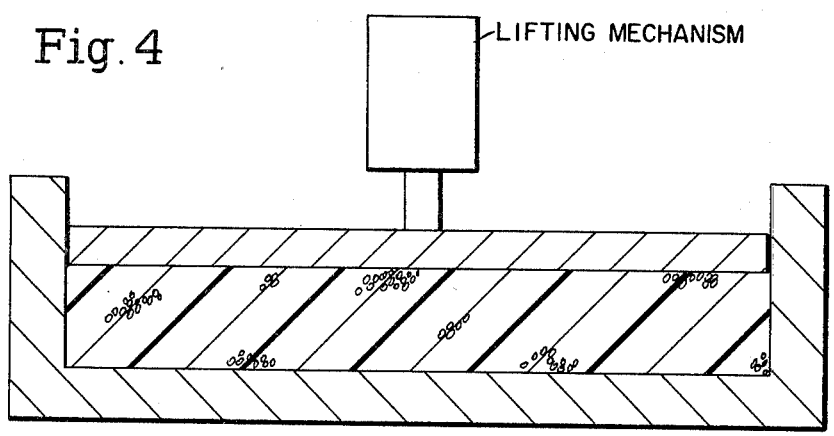
Figure 5:
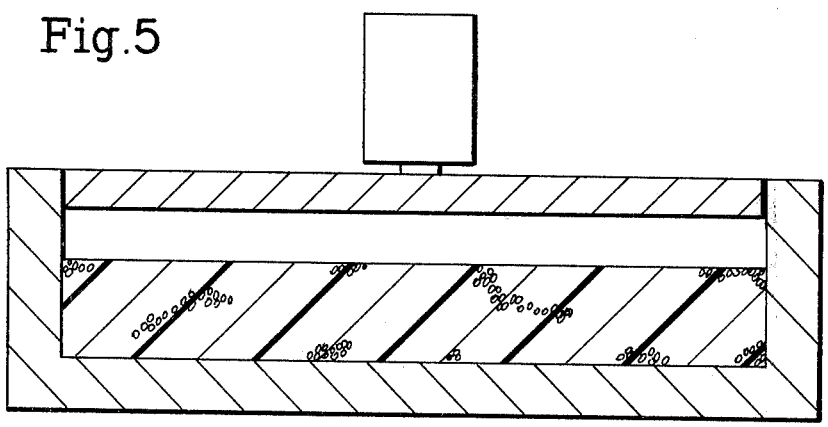
Figure 6:
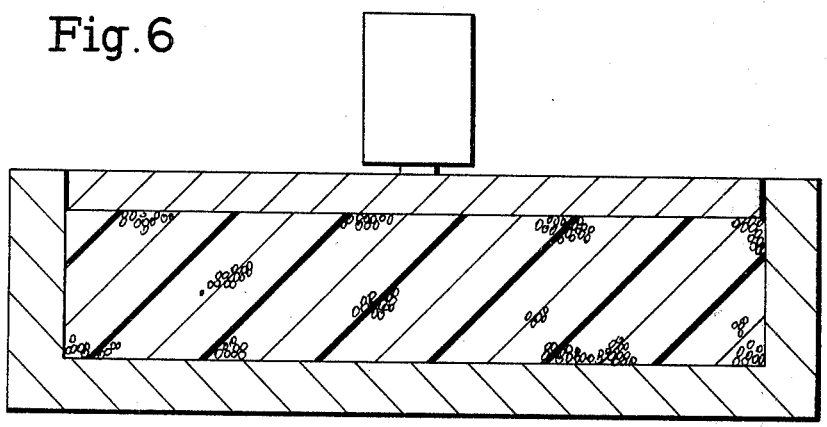

A better understanding of the present invention and of its many advantages will be had by reference to the accompanying drawings, in which FIG. 1 is a plan sectional view of an unfoamed plate within a mold cavity; FIG. 2 is a side sectional view of the same arrangement taken along line 2—2 of FIG. 1; FIG. 3 is a side sectional view through a freely foamed foamable resin sheet with the dimensions of the unfoamed starting material and of the freely foamed sheet indicated therein; and FIGS. 4–6 are all side sectional views showing a mold arrangement which can be enlarged in one direction and which is adaptable to use in a further two-step method of the present invention.

In the Figures, the unfoamed sheet has a rectangular base with dimensions a and b and a thickness c. The mold cavity similarly has a rectangular base with sides A and B and an interior height C. The geometric similarity of the two rectangular surfaces requires that the following relationship pertain between the length of the sides:

$$A/a = F_s \text{ and } B/b = F_s.$$

For the thickness relationship, the following is valid:

$$C/c = F_t$$

If the foamable sheet having dimensions a, b, and c were freely foamed under the conditions of the method, it would—as shown in accompanying FIG. 3—reach the dimensions a', b', c'. Thus, the (free) foaming factor for the increase in thickness is $$c'/c = S_t$$

and the (free) foaming factor for growth in the sidewards direction is:

$$a'/a = b'/b = S_s$$

The size of the mold cavity is so dimensioned that $F_s$ is less than $S_s$ and $F_t$ is less than $S_t$. Further $F_s$ is less than $F_t$, but the ratio $F_t/F_s$ can closely approach unit value. It must be observed that the foaming factors $S_t$ and $S_s$ are not material constants for a specific foamable material but are constants only for specific foaming conditions which are essentially determined by the foaming temperature and rate of heating. Further, the method of the invention can only be carried out with sure results if the factors $F_t$ and $F_s$ do not deviate greatly from the foaming factors $S_t$ and $S_s$. In general the following is valid:

$$F_t = (0.55 - 1.0)S_t \text{ and}$$

$$F_s = (0.50 - 0.98)S_s.$$

Preferably:

$$F_t = (0.85 - 1.0)S_t$$

$$F_s = (0.80 - 0.98)S_s.$$

In the preparation of technical foams from foamable synthetic resins, the free-foaming factors as a rule are between about 1.5 and 4. The expansion attained according to the invention, which is limited because of the limiting surfaces, lies essentially in the same region. Densities between about 20 kg/m$^3$ and 400 kg/m$^3$ are obtained.

According to the process of the invention, the mold is first completely filled over the total base area so that the foam lies closely on all sides next to the side walls before it reaches a thickness, in any portion, which reaches the interior height of the mold. Only in the further course of the foaming process does the foam body attain a thickness which completely fills the interior height of the mold cavity. Since the foaming factor in all directions would permit a somewhat further expansion, the foam presses against the limiting surfaces with a certain pressure. The mechanical strength of the mold must be sufficient to withstand this pressure without deformation. After the complete filling of the mold, the foam is permitted to cool below the foaming temperature within the mold. (By the foaming temperature is to be understood that temperature at which further expansion can take place.) If—as in the preparation of polymethacrylimide foams—a chemical change takes place in the synthetic resin simultaneously with the foaming process, the minimum temperature necessary for foaming may rise during the course of the process so that cooling to a temperature which is higher than the initial foaming temperature can be sufficient. Preferably, the foam is permitted to cool in the mold until it has cooled below the softening temperature which, in any event, usually coincides with the lower limits of the foaming temperature. After cooling, the foam can be taken from the mold and will maintain a form corresponding to that of the mold. In this way, foamed sheets of standardized size and density are obtained directly.

The foamable sheet at the beginning of the process is significantly smaller than the mold cavity available for expansion. In unfavorable cases, it can happen that the sheet at the beginning of the forming process bends so strongly that the edges curl. A uniform filling of the mold is then no longer possible. Such bending can be discouraged by maintaining—at the beginning of the method—the limiting surfaces which inhibit expansion in the thickness direction at a spacing which is smaller than necessary for full expansion in the thickness direction. Then, in the course of the method the walls are adjusted to the position necessary for completion of the method. In this way, when bending begins the foaming plate bumps up against the limiting surfaces whereby curling up of the edges is hindered. However, the separation of the limiting surfaces must, even in this method embodiment, be maintained farther apart than the thickest portion of the sheet at any given time so that the sheet cannot bind under the foaming pressure and in this way inhibit or hinder further expansion in the mold.

The final foaming temperature can be reached by step-wise heating. Advantageously, the foamable sheet is warmed to a temperature close to the foaming temperature before beginning the foaming process. This heating can take place outside the mold in a suitable warming oven. Thus, only a small further heating in the mold is then necessary to initiate the foaming process.

In a preferred embodiment of the invention illustrated in FIGS. 4–6, after the mold is completely filled as shown in FIG. 4, the foaming temperature is raised once again and the limiting surfaces which inhibit expansion in the thickness direction are again spaced somewhat further apart, as shown in FIG. 5, so that a supplemental expansion in the thickness direction can occur, as shown in FIG. 6.

Increased strength values in the direction of the plane of the sheet can be attained by compressing the foam before cooling with a press which brings the limiting surfaces for the thickness expansion to an essentially smaller separation. According to German Pat. No. 2,114,524, foams with improved strength properties can be obtained by this method.

The method of the invention can be performed with all foamable synthetic resins which on heating will foam three-dimensionally. The foamable materials comprise a synthetic resin matrix in which is distributed a finely-divided blowing agent which is converted into a gaseous condition at the foaming temperature. For the preparation of hard foams, such synthetic resins are employed whose softening temperature is above room temperature at a time no later than the conclusion of the foaming process. During the foaming process, the resin is present in a thermoelastic or thermoplastic condition. In contrast, if a resin having a softening temperature below room temperature is employed, a soft foam is obtained. In this case, the expansion is carried out only with the synthetic resin in a thermoplastic condition. After extensive or complete foaming, the thermoplastic condition can optionally be converted to a thermoelastic condition as a result of cross-linking or other chemical transformations.

Various methods are known for preparing heat-foamable synthetic rsins. For example, the resin, in powdered form, can be mixed with the blowing agent and pressed into a foamable sheet. To the extent that foaming agents are employed which do not convert irreversibly into a gaseous condition, compression with heating can be carried out under a pressure which hinders foaming. For this purpose, for example, screw presses are also suitable. Suitable synthetic resins for such a method are, for example, polyvinylchloride, polycarbonate resins, polymethylmethacrylate, polystyrene, or copolymers of styrene. As blowing agents, for example, organic liquids can be used which are present in a vapor phase at the softening temperature of the synthetic resins employed. The gasoline hydrocarbons, chlorohydrocarbons, esters, ketones, and alcohols belong to this class of materials. Blowing agents which convert irreversibly into a gaseous condition are, for example, sodium bicarbonate, ammonium carbonate, urea, formamide, and azo-bis-isobutyronitrile. The temperatures suitable for working up these foamable synthetic resins in general lie in the region between 100° C. and 200° C.

The process of the invention is carried out to particular advantage with such synthetic resins which convert onto heating into polyacrylimide or polymethacrylimide. These resins are essentially copolymers of acrylic acid and/or methacrylic acid with acrylonitrile and/or methacrylonitrile and optionally contain subordinate amounts of further comonomers copolymerizable therewith. As a rule, the synthetic resins are prepared by free-radical polymerization of the aforementioned monomers in the presence of a blowing agent which is compatible with the copolymer formed. Suitable blowing agents are, for example, formamide, monomethyl formamide, urea, dimethyl urea, lower aliphatic alcohols such as isopropyl alcohol or tert.-butyl alcohol, and water. The preparation of foamable sheets from these materials is described, for example, in British Pat. Nos. 1,078,425, and 1,045,229, in German Pat. 1,817,156 and in German Patent Publication 27 26 259. The homogeneous sheets obtained, which are, for example, 10–30 mm in thickness, can be cut into plates of the desired size and foamed at temperatures between 170° C. and 220° C. to form polyacrylimide or polymethacrylimide foams having densities between 20 kg/m$^3$ and 400 kg/m$^3$.

The method of the invention is illustrated by reference to the following typical Examples.

EXAMPLE 1

A sheet having the dimension 745.5×406.5×22 mm, comprising 100 parts of a copolymer of methacrylic acid and methacrylonitrile in a ratio of 60:40 to which 5 parts of urea and 1 part of formamide are added, is introduced into a mold having the dimensions 1980×1080×70 mm. The mold had already been preheated to 182° C. before introducing the polymer sheet. After inserting the polymer sheet and closing the mold, the latter was held at this temperature for two hours. After cooling to 80° C., a foamed block was taken from the mold, which block corresponded in its dimensions exactly to the dimensions of the mold cavity. The apparent density of the foam block was 53 kg/m$^3$. The free foaming factors at 182° C. are: $S_s = 2.9$ and $S_t = 3.24$.

EXAMPLE 2

A polymer sheet of the composition described in Example 1 having the dimensions 1020×510×22 mm was preheated for one hour at 130° C. The pre-warmed sheet was inserted in a heatable and coolable mold which had a base surface of the dimensions 2400×1200 mm. The depth of the mold was 62 mm. The mold had a temperature of 176° C. After a foaming time of 110 minutes, the mold was heated to a temperature of 189° C. After a further ten minutes, the upper and lower limiting surfaces of the mold were moved apart by 3 mm and left in this position until the foam block had cooled to a temperature of 80° C. The foam block removed from the mold had a size of 2395×1196×64 mm. The apparent density was 76 kg/m$^3$. The free foam factors at 176° C. are: $S_s = 2.62$ and $S_t = 2.85$.

What is claimed is:

1. A method for making a foamed resin sheet from a solid body of foamable unfoamed synthetic resin containing a blowing agent, said foamable unfoamed body having a predetermined lateral shape and dimensions and a predetermined thickness, which method comprises foaming said foamable unfoamed body by heating it to a temperature which initiates foaming while said body is present within the closed cavity of a mold having rigid mold walls with sufficient mechanical strength to withstand without deformation the pressure of the foaming body and continuing foaming until said closed mold cavity is completely filled, said mold cavity having a lateral base the shape of which is geometrically similar to but larger than the lateral shape of said foamable unfoamed body and further having a depth which is greater than the thickness of said foamable unfoamed body, the ratio of the depth of said mold cavity to the thickness of said foamable unfoamed body being greater than the ratio of the dimensions of the lateral base of said mold cavity to the lateral dimensions of said foamable unfoamed body, whereby said foamable unfoamed body expands when foaming to fill said mold cavity laterally before filling said mold cavity to its entire depth; and then cooling the resultant foamed resin sheet below the foaming temperature while in the now-filled closed mold cavity.

2. A method as in claim 1 wherein said solid body of foamable unfoamed synthetic resin contains (1) a copolymer comprising at least one member selected from the group consisting of acrylic acid and methacrylic acid and at least one member selected from the group consisting of acrylonitrile and methacrylonitrile and (2) a blowing agent compatible with said copolymer.

3. A two-step method for making a foamed resin sheet from a solid body of foamable unfoamed synthetic resin containing a blowing agent, said foamable unfoamed body having a predetermined lateral shape and dimensions and a predetermined thickness, which method comprises partially foaming said foamable unfoamed body in a first step by heating it to a first temperature which initiates foaming while said body is present within the closed cavity of a mold having rigid mold walls with sufficient mechanical strength to withstand without deformation the pressure of the foaming body and continuing foaming at said first temperature until said closed mold cavity is completely filled, said mold cavity having a lateral base the shape of which is geometrically similar to but larger than the lateral shape of said foamable unfoamed body and further having a depth which is greater than the thickness of said foamable unfoamed body, the ratio of the depth of said mold cavity to the thickness of said foamable unfoamed body being greater than the ratio of the dimensions of the lateral base of said mold cavity to the lateral dimensions of said foamable unfoamed body, whereby said foamable unfoamed body expands when foaming to fill said mold cavity laterally before filling said mold cavity to its entire depth; then, in a second step, enlarging one dimension of said closed mold cavity and initiating further foaming by raising the temperature to a second temperature higher than said first temperature and continuing foaming until said enlarged closed mold cavity is again completely filled; and then cooling the resultant foamed resin sheet below the foaming temperature while in the now-filled enlarged closed mold cavity.

4. A method as in claim 3 wherein said solid body of foamable unfoamed synthetic resin contains (1) a copolymer comprising at least one member selected from the group consisting of acrylic acid and methacrylic acid and at least one member selected from the group consisting of acrylonitrile and methacrylonitrile and (2) a blowing agent compatible with said copolymer.

* * * * *